United States Patent
Nock et al.

(10) Patent No.: US 10,435,050 B2
(45) Date of Patent: Oct. 8, 2019

(54) METHOD FOR MONITORING AND DIAGNOSING COMPONENTS OF A RAIL VEHICLE BY MEANS OF AN EXTENSIBLE EVALUATION SOFTWARE

(71) Applicant: KNORR-BREMSE SYSTEME FÜR SCHIENENFAHRZEUGE, München (DE)

(72) Inventors: Marco Nock, Feldkirchen (DE); Benjamin Behmann, München (DE); Martin Moser, München (DE); Markus Häbel, Neunkirchen (DE)

(73) Assignee: KNORR-BREMSE SYSTEME FÜR SCHIENENFAHRZEUGE (DE)

( * ) Notice: Subject to any disclaimer, the term of this patent is extended or adjusted under 35 U.S.C. 154(b) by 0 days.

(21) Appl. No.: 15/512,367

(22) PCT Filed: Aug. 27, 2015

(86) PCT No.: PCT/EP2015/069579
§ 371 (c)(1),
(2) Date: Mar. 17, 2017

(87) PCT Pub. No.: WO2016/041756
PCT Pub. Date: Mar. 24, 2016

(65) Prior Publication Data
US 2017/0274916 A1   Sep. 28, 2017

(30) Foreign Application Priority Data
Sep. 17, 2014 (DE) .................. 10 2014 113 371

(51) Int. Cl.
B61L 15/00 (2006.01)
B60T 17/18 (2006.01)
(Continued)

(52) U.S. Cl.
CPC .......... B61L 15/0081 (2013.01); B60T 17/18 (2013.01); B60T 17/20 (2013.01); B60T 17/22 (2013.01);
(Continued)

(58) Field of Classification Search
None
See application file for complete search history.

(56) References Cited

U.S. PATENT DOCUMENTS

| | | | |
|---|---|---|---|
| 5,201,834 | A | 4/1993 | Grazioli et al. |
| 2005/0171661 | A1 | 8/2005 | Abdel-Malek et al. |

(Continued)

FOREIGN PATENT DOCUMENTS

| | | |
|---|---|---|
| CN | 101654112 A | 2/2010 |
| CN | 102139700 A | 8/2011 |

(Continued)

OTHER PUBLICATIONS

Search Report and Written Opinion for International Patent Application No. pct/ep20015/069579; dated Nov. 16, 2015.
(Continued)

*Primary Examiner* — Tung S Lau
(74) *Attorney, Agent, or Firm* — Barnes & Thornburg LLP

(57) ABSTRACT

A method for monitoring and diagnosing components of a rail vehicle, as a singular rail vehicle or as part of a rail vehicle train consisting of a plurality of rail vehicles, with regard to the necessary repair or maintenance, as appropriate, of at least one component, in which at least one measuring device captures at least one measurement variable, which is relevant to an assessment of a necessary repair or maintenance, as appropriate, of the component, is performed in which supplementation, extension, modification or adaptation of evaluation software implemented in an
(Continued)

evaluation device is performed based on instructions, data and/or software modules sent from a control center to the evaluation device.

18 Claims, 6 Drawing Sheets

(51) Int. Cl.
| | |
|---|---|
| *B60T 17/20* | (2006.01) |
| *B60T 17/22* | (2006.01) |
| *B61L 27/00* | (2006.01) |
| *B61K 9/00* | (2006.01) |
| *B61L 23/04* | (2006.01) |
| *B61L 25/02* | (2006.01) |
| *B61L 27/04* | (2006.01) |
| *F16D 66/02* | (2006.01) |
| *F16D 66/00* | (2006.01) |

(52) U.S. Cl.
CPC .......... *B60T 17/221* (2013.01); *B60T 17/228* (2013.01); *B61K 9/00* (2013.01); *B61L 15/0027* (2013.01); *B61L 15/0072* (2013.01); *B61L 23/04* (2013.01); *B61L 25/02* (2013.01); *B61L 25/025* (2013.01); *B61L 27/0005* (2013.01); *B61L 27/0077* (2013.01); *B61L 27/0094* (2013.01); *B61L 27/04* (2013.01); *F16D 66/027* (2013.01); *B61L 2201/00* (2013.01); *B61L 2205/00* (2013.01); *F16D 2066/001* (2013.01)

(56) References Cited

U.S. PATENT DOCUMENTS

| | | | | |
|---|---|---|---|---|
| 2006/0131464 | A1* | 6/2006 | Hesser | B61K 9/06 246/169 D |
| 2007/0174467 | A1* | 7/2007 | Ballou, Jr. | H04L 63/0838 709/227 |
| 2007/0273518 | A1* | 11/2007 | Lupoli | G06Q 10/08 340/572.1 |
| 2010/0204857 | A1* | 8/2010 | Forrest | B61L 27/0094 701/19 |
| 2012/0074266 | A1* | 3/2012 | Daum | B61L 3/20 246/186 |
| 2012/0078452 | A1* | 3/2012 | Daum | B61L 3/20 701/19 |
| 2013/0342362 | A1* | 12/2013 | Martin | B61L 15/0027 340/870.16 |

FOREIGN PATENT DOCUMENTS

| | | |
|---|---|---|
| DE | 201 17 397 U1 | 1/2002 |
| DE | 102 20 812 A1 | 1/2003 |
| DE | 102 33 845 A1 | 2/2004 |
| DE | 102 33 845 B4 | 12/2005 |
| DE | 10 2007 006614 A1 | 8/2008 |
| DE | 10 2013 201494 A1 | 3/2014 |
| GB | 2378248 A | 2/2003 |
| WO | 01 23238 A1 | 4/2001 |
| WO | 0184105 A1 | 11/2001 |
| WO | 2004024531 A1 | 3/2004 |
| WO | 2008141775 A1 | 11/2008 |

OTHER PUBLICATIONS

Günther Seliger / Ulrich Kroß: "Effektive Instandhaltung bei neuartigem Güterwagendrehgestell mit integrierter Life Cycle Unit" In: El-Eisenbahningenieur (55) Mar. 2004.

Chinese Office Action corresponding to 201580062026.1, dated Jun. 4, 2018.

* cited by examiner ered immediately or in the future is carried out by an evaluation software implemented in an evaluation device arranged on board the rail vehicle or rail vehicle train, and in which, in the event that the evaluation device deems that it is necessary for a repair or maintenance of the component concerned to be carried out immediately or in the future, a message relating to this is generated by the evaluation device and transmitted to a control center. which is located outside the rail vehicle or outside the rail vehicle train. An example of such operation is known, for example, from DE 102 33 845 B4.

METHOD FOR MONITORING AND DIAGNOSING COMPONENTS OF A RAIL VEHICLE BY MEANS OF AN EXTENSIBLE EVALUATION SOFTWARE

CROSS REFERENCE

This patent application is a U.S. National Phase of International Patent Application No. PCT/EP2015/069579, filed 27 Aug. 2015, which claims priority to German Patent Application 10 2014 113 371.4, filed on 17 Sep. 2014, the disclosures of which are incorporated herein by reference in their entirety.

FIELD

Disclosed embodiments are based on a method for monitoring and diagnosing components of a rail vehicle, being a single rail vehicle or being part of a rail vehicle train, consisting of a plurality of rail vehicles, with regard to a repair or maintenance which may be necessary of at least one of its components.

BACKGROUND

Various known measuring devices capture at least one measured variable, which is relevant to an assessment of a repair or maintenance which may be necessary of the component, and in which an evaluation of the captured measured variable with regard to a repair or maintenance of the component concerned which may be required immediately or in the future is carried out by an evaluation software implemented in an evaluation device arranged on board the rail vehicle or rail vehicle train, and in which, in the event that the evaluation device deems that it is necessary for a repair or maintenance of the component concerned to be carried out immediately or in the future, a message relating to this is generated by the evaluation device and transmitted to a control center. which is located outside the rail vehicle or outside the rail vehicle train. An example of such operation is known, for example, from DE 102 33 845 B4.

SUMMARY

Disclosed embodiments, are based on the task of further developing a method and a system of the type mentioned above in such a way that it is more flexibly applicable.

According to disclosed embodiments, it is provided that the evaluation software implemented in the evaluation device is supplemented, extended, modified or adapted by means of instructions, data and/or software modules sent from the control center to the evaluation device. In particular the evaluation device and the control center are so designed that this is possible, for example in that the structure of the evaluation software is modular, so that this can at any time be supplemented or modified through new software modules or through the exchange or deletion of software modules.

BRIEF DESCRIPTION OF THE FIGURES

Disclosed innovations are described in more detail below in terms of exemplary embodiments and with reference to the attached drawing. Here.

DETAILED DESCRIPTION

Figure 1:
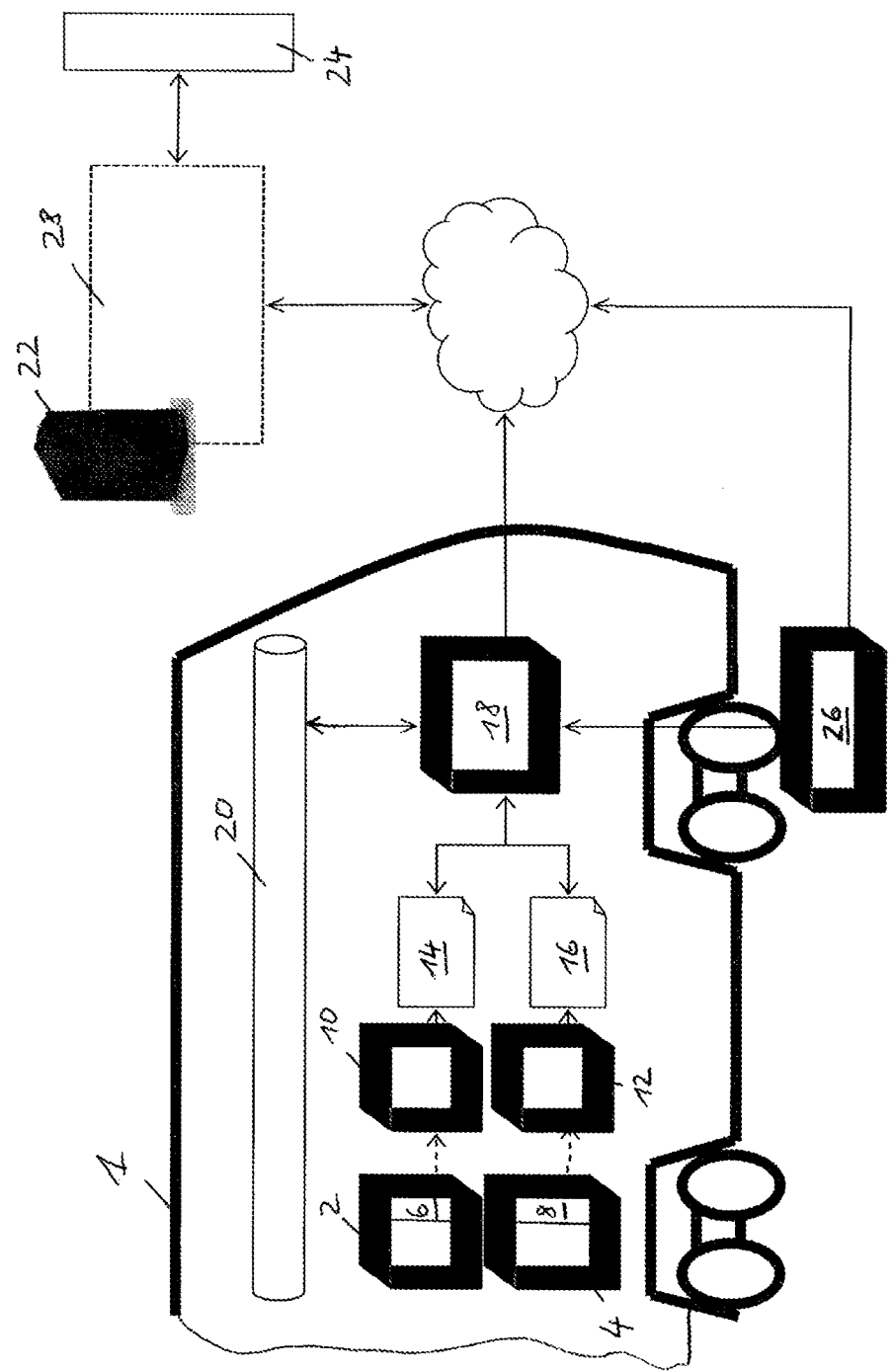
FIG. 1 shows a schematic structure of a system for monitoring and diagnosing components of a rail vehicle for the execution of a method for monitoring and diagnosing components of the rail vehicle according to a disclosed embodiment.

Disclosed operations may take place while the rail vehicle or rail vehicle train is operating according to its intended use or driving operation, i.e. the rail vehicle or the rail vehicle train is located on the route to be traveled, or, alternatively, is in the depot.

A control center is not only intended here to refer to a stationary control center which is, for example, housed in an office in the form of a data processing apparatus. Rather does this term also include a mobile or portable control center which, for example, is brought up to the rail vehicle or to the rail vehicle train, and which is connected to interfaces provided for this purpose for wired data transmission, or is brought to a distance suitable for this purpose for wireless data transmission.

The supplementation, extension, modification or adaptation of the evaluation software implemented in the evaluation device is performed here as required, i.e. if it is necessary or if it is deemed to be necessary by the personnel in the control center.

The advantages of these measures are that the evaluation algorithms or the evaluation software can be supplemented, modified or adapted on board during ongoing operation of the rail vehicle or of the rail vehicle train, without having to interrupt the operation or use for this purpose. This supplementation, modification or adaptation of the evaluation software takes place without repercussions, and the operation or operational safety in accordance with intended use of the rail vehicle or rail vehicle train is not impaired. It is, furthermore, ensured that the method can economically and easily be modified (accessibility), or that additional functions can be supplemented on the rail vehicle train (modular and scalable), without affecting operation or safety-relevant functions.

A so-called condition-based maintenance (CBM) is realized through the said measures, in which maintenance forecasts based on the existing operational data of the rail vehicle/rail vehicle train and, optionally, also on environmental data (e.g. ambient temperature, air humidity, route data) are determined automatically and are made available to the operator or the maintainer. Such a system provides the technical preconditions for enabling condition-based maintenance. This makes it necessary to network the individual systems on the rail vehicle (subsystems, components, vehicle control equipment) together, as well as a continuous, dynamic adaptation of the methods for determining wear reserves and the maintenance requirement derived therefrom, which is implemented by the disclosed embodiments. A CBM system of this sort supplies information for the operative maintenance in the form of messages which yield recommendations for the optimum point in time for maintenance.

A CBM system of this sort contains at least one evaluation device on the rail vehicle/rail vehicle train (on-board unit) and a control center (back office) on the route, wherein maintenance forecasts based on the operational and environmental data present at the time are generated automatically in the form of the messages sent by the evaluation device to the control center. For this purpose, the evaluation software or the CBM logic contains an appropriate decision logic for the recommendation of optimum points in time for maintenance. The CBM logic integrated into the evaluation device therefore supplies, on the basis of a combination of commercial and technical parameters, results in respect of an optimum point in time for performance of maintenance measures.

Based on the physical measured variables, the wear reserve of the component concerned, or of the subsystems concerned of the rail vehicle/rail vehicle train, is determined by means of the evaluation software, from which the maintenance requirement of the components concerned or of the subsystems is determined. The message transmitted to the control center (CBM message) contains, for example, information as to the time by which a maintenance should be planned.

An on-board unit, with which the various evaluation devices (intelligent subsystems) assigned to the respective components communicate, then, for example, forms an interface between the evaluation devices and the control center associated with the track route.

In order to permit an extensibility of the software architecture for the integration of further functions, including during the operation of a rail vehicle/rail vehicle train, data, instructions and/or software modules are dynamically downloaded to the on-board unit from the control center (back office) by means of remote data transmission.

Particularly optionally, the evaluation software has a modular structure, wherein individual software modules can be extended, deleted or exchanged as required.

According to one development, a software module is assigned to each component that is to be monitored or diagnosed in respect of a repair or maintenance. In other words, the structure of the modularity of the evaluation software optionally reflects the structure of the components of the rail vehicle or of the rail vehicle train that are to be monitored or diagnosed. Each software module is then adapted to the respective assigned component.

Particularly optionally, the supplementation, modification or adaptation of the evaluation software implemented in the evaluation device takes place through wireless communication with the control center. Such a wireless communication can, for example, take place through a radio connection between a transmit/receive device installed in the rail vehicle/rail vehicle train and a transmit/receive device installed in the control center, but may also take place via WLAN in the depot. Alternatively this can also take place by means of an on-route connection in the track bed. The message sent by the rail vehicle/rail vehicle train to the control center optionally also uses this path.

The message transmitted to the control center here optionally contains an identification of the component concerned.

The message furthermore optionally also contains information about a wear reserve that is still present of at least one component of the rail vehicle or the rail vehicle train that is affected by wear. Reaching a prescribed wear limit can thus be forecast in time or with reference to the number of usage cycles of the component concerned that are still possible or permitted. The message therefore optionally contains a forecast of the time still remaining or of the number of usage cycles still available until a maintenance or repair of the component concerned is necessary.

According to one development, the message can also contain information about the cause of a malfunction or fault of the component that may have occurred. In this case, the evaluation software or the measuring device are so designed that such information can be supplied, and the measured variable is also appropriate for this.

In the case of a plurality of rail vehicles grouped together into a rail vehicle train, the message can also identify the rail vehicle affected by a necessary maintenance or repair.

Particularly favorably, the message contains differing urgency levels in respect of a necessary maintenance or repair of the component. Such an urgency level can, for example, represent a chronologically long-term, short-term or immediate requirement for a maintenance or repair measure of the component concerned.

The message can, furthermore, also contain the present location of the rail vehicle or of the rail vehicle train.

Particularly favorably, the message is output in the control center in visual form.

Particularly favorably, the instructions, data and/or software modules sent from the control center to the evaluation device also contain such instructions, data and/or software modules that relate to the function as intended of the component. In other words, not only is the evaluation software supplemented, modified or adapted in this way, but also the software through which the component concerned is controlled or regulated in respect of its function as intended.

Particularly favorably, a central on-board unit, which communicates with the evaluation devices of a plurality of components and delivers the message(s) to the control center, is provided on board the rail vehicle or the rail vehicle train.

Particularly favorably, further measured variables that are not related to the component concerned or assigned, are evaluated by the evaluation device or by the evaluation devices, wherein the further measured variables relate to the environment or to the route being traveled by the rail vehicle or rail vehicle train.

The components that are overseen in respect of their maintenance or repair requirement are optionally at least one of the following components: bogie equipment, air conditioning unit, air supply system, electrical supply system, sanding system, door opening and closing system, windscreen wiper apparatus, friction-based braking system, generator-based braking system (electro-dynamic brake), magnetic disc brake, toilets, brake controller, wherein this list is not, however, exhaustive.

FIG. 1 shows a schematic structure of a system for monitoring and diagnosing components 2, 4 of a rail vehicle 1 in respect of a repair or maintenance of the components 2, 4 which may be necessary, according to an optional form of embodiment. The rail vehicle 1 is, for example, a single rail vehicle or a rail vehicle of a rail vehicle train consisting of a plurality of rail vehicles.

In the rail vehicle 1 illustrated in FIG. 1, two components or subsystems 2, 4 are, for example, diagnosed or monitored in respect of a repair or maintenance which may be necessary, for example a friction-based electro-pneumatic brake 1 in a bogie of the rail vehicle 1 and a sanding device 2, 4.

At least one measuring device 6, 8 in the form of a sensor that captures a measured variable, which is relevant to an anticipatory maintenance or repair of the component 2, 4 concerned is here assigned to each component or subsystem 2, 4. In a friction-based electro-pneumatic brake 2 with disc brakes as actuators, such a measured variable is, for example, the temperature and/or the lining thickness of the brake lining or the brake disc of the disc brake. The lining thickness can, for example, be detected by electrical loops integrated into the brake lining which are destroyed when the brake lining becomes worn down to the layer of the lining in which these loops are arranged, and then generate a corresponding electrical signal. In the case of the sanding device 2, 4, the measured variable consists, for example, of a measured level of the sandbox or of a measured rate of flow of a sand pipe.

Two electronic evaluation devices 10, 12 with at least one microprocessor are then optionally arranged on board the rail vehicle 1, namely a first evaluation device 10 for evaluation of the measured variable concerning the friction-based electro-pneumatic brake, and a second evaluation device 12 for evaluation of the measured variable concerning the sanding device 2, 4. An evaluation of the captured measured variable with regard to a repair or maintenance of the component concerned which may be required immediately or in the future then is carried out in each evaluation device 10, 12 by an evaluation software implemented in each. The evaluation software is here adapted in each case to the specific evaluation of the measured variable concerned.

In the event that the evaluation software deems, on the basis of the respective measured variable, that it is necessary for a repair or maintenance of the component 2, 4 concerned to be carried out immediately or in the future, a message 14, 16 relating to this is generated by the evaluation device 10, 12. It is therefore optional for an individual message 14, 16 to be generated by the evaluation device 10, 12 concerned for each monitored component or for each monitored subsystem 2, 4, being in this case a first message 14 and a second message 16.

The two messages 14, 16 are then transmitted by the two evaluation devices 10, 12 to a central unit 18 on the rail vehicle 1. Such a central unit 18 is optionally present on board each rail vehicle 1. The central unit 18 represents an electronic device with at least one microprocessor.

The central unit 18 is connected on the one hand to a vehicle data bus 20 of the rail vehicle 1 for data exchange with other systems of the rail vehicle 1, and also, for example wirelessly, connected optionally wirelessly with a device 26 which acquires and/or saves environmental data of the rail vehicle 1, such as the environmental temperature and route data such as, for example, an upward incline, a downward incline, or a curve radius, and supplies it to the central unit 18. The messages 14, 16 generated by the evaluation devices 10, 12 or the evaluation software can then be supplemented or corrected using such data in the central unit 18.

Instead of two evaluation devices 10, 12, it is also possible for only one evaluation device to be provided for a plurality of components and the measurement devices associated with them, which then generates multiple messages 14, 16.

Such a message 14, 16 contains here on the one hand optionally an identification and/or localization of the component 2, 4 concerned, here, for example, a disc brake on the first axis at the second bogie of the rail vehicle 1. In the case of a plurality of rail vehicles grouped together into a rail vehicle train, the message 14, 16 can also identify the rail vehicle 1 affected by a necessary maintenance or repair.

A message 14, 16 furthermore optionally also contains information about a wear reserve that is still present of the brake disc or brake lining. In this way the time at which a prescribed wear limit is reached can be forecast. A message therefore optionally also contains a forecast of the time still remaining or of the number of usage cycles still available until a maintenance or repair of the component 2, 4 concerned is necessary.

Particularly favorably, a message 14, 16 contains differing urgency levels in respect of a necessary maintenance or repair of the component 2, 4. Such an urgency level can, for example, represent a chronologically long-term, short-term or immediate requirement for a maintenance or repair measure of the component 2, 4 concerned.

Figure 4:
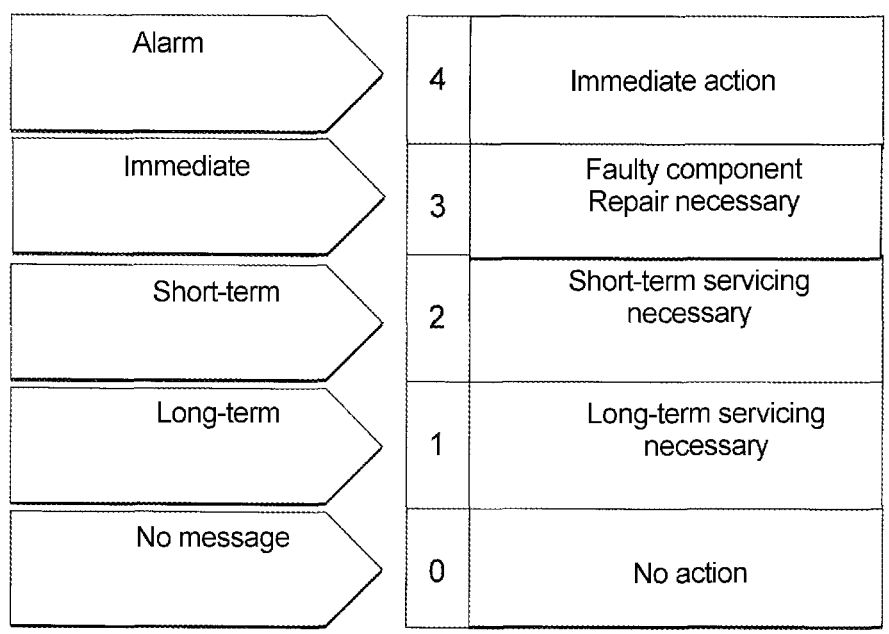
FIG. 4 shows a schematic table that represents the various urgency levels of a message.

An example of four possible urgency levels, no. 0 to no. 4, is illustrated in FIG. 4. Accordingly, the message is not generated if the evaluation of the measured variable concerned leads to the result that there is no requirement for action (urgency level no. 0). An urgency level no. 1 quoted in the message 14, 16 can require a long-term servicing or repair, while the respective deadline for the urgency level no. 2 is shorter. A very short-term repair or maintenance of a component 2, 4 can be made known through an urgency level no. 3 in the message. An urgency level no. 4 indicates here that there is a necessity for immediate action, an immediate repair or maintenance, even involving immediate removal of the rail vehicle 1 from operation.

The messages 14, 16 are then transmitted, for example wirelessly, by means of a transmit/receive device integrated into the central unit 18, for example in the context of cloud computing, to a server 22 in a control center 28, which also has a suitable transmit/receive device. The messages 14, 16, are then output there, optionally in visual form on a display device 24. The server 22 can optionally also wirelessly receive the data of the device 26 that captures the measured variables of the environment or the route data.

This optionally wireless transfer can either take place as soon as a wireless radio connection is or can be established, or can also take place via WLAN in the depot. Alternatively the communication can also take place by means of an on-route connection in the track bed.

The central unit 18 is, for example, fitted with GPS, so that the message 14, 16 can also contain the present location of the rail vehicle 1 or the rail vehicle train.

Figure 2:
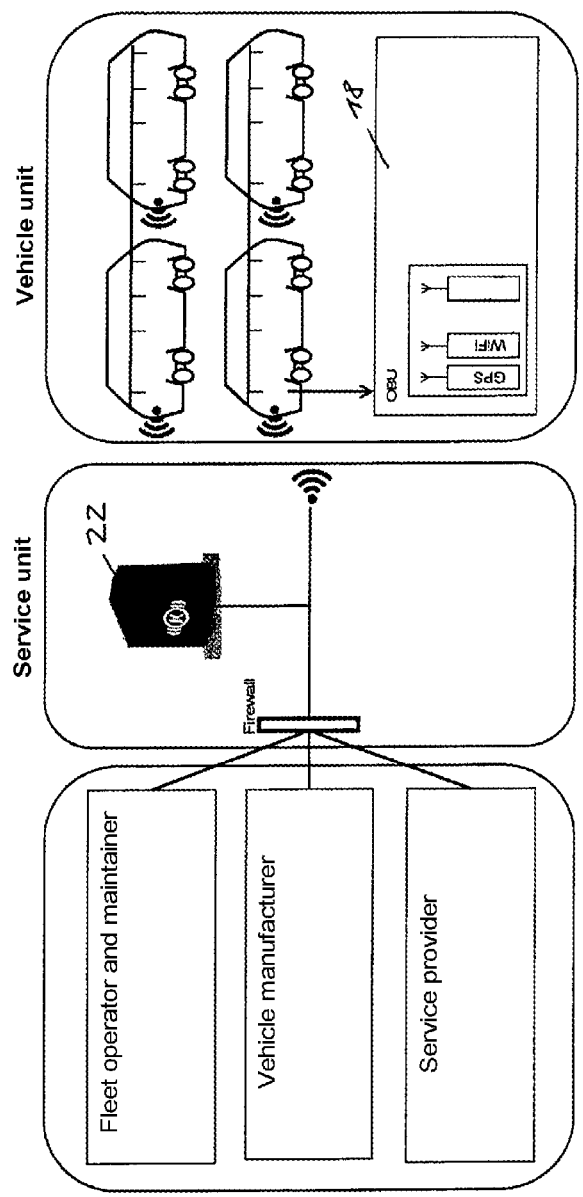
FIG. 2 shows a detail of a further form of embodiment of the system.

As is illustrated in FIG. 2, it is possible in the said manner for components and subsystems (in FIG. 2: SS1 to SS3) of rail vehicles of an entire fleet of rail vehicle trains consisting of a plurality of rail vehicles (in FIG. 2: Consist 1, Consist 2) to be diagnosed or monitored with regard to a repair or maintenance which may be necessary, wherein then optionally each of these rail vehicles (in FIG. 2: Consist 1, Consist 2) has a central unit 18 (OBM, on-board unit) as described above which then transmits the messages 14, 16 to the server unit 22 in the command center. The server 22 of the control center 28 can then also make the messages 6, 8 available over the internet or other data network to an end user such as the fleet operator and maintainer, the vehicle manufacturer and/or the service provider.

Figure 3:
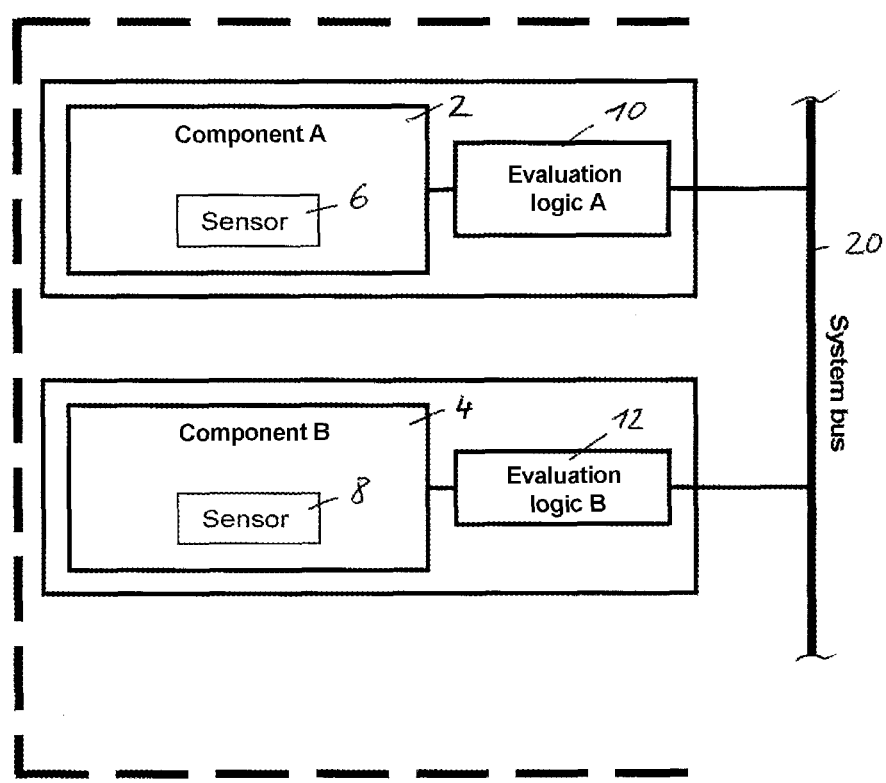
FIG. 3 shows a plan view of the form of embodiment of FIG. 2.

In the form of embodiment of FIG. 3, as in the form of embodiment of FIG. 1, a dedicated measuring device 6, 8 and a dedicated evaluation device 10, 12, together with integrated evaluation software, is assigned to each of the components 2, 4 to be monitored, wherein the evaluation devices 10, 12 are here each connected to the vehicle data bus 20 in order to transmit the messages 14, 16 it generates to the central unit 18 of the rail vehicle 1 via the vehicle data bus 20. Alternatively, it is also possible for only one evaluation device to be provided for a plurality of components or subsystems, wherein the evaluation software is then so configured that it can process the measured variables of a plurality of measuring devices and generate a plurality of messages.

Figure 5:
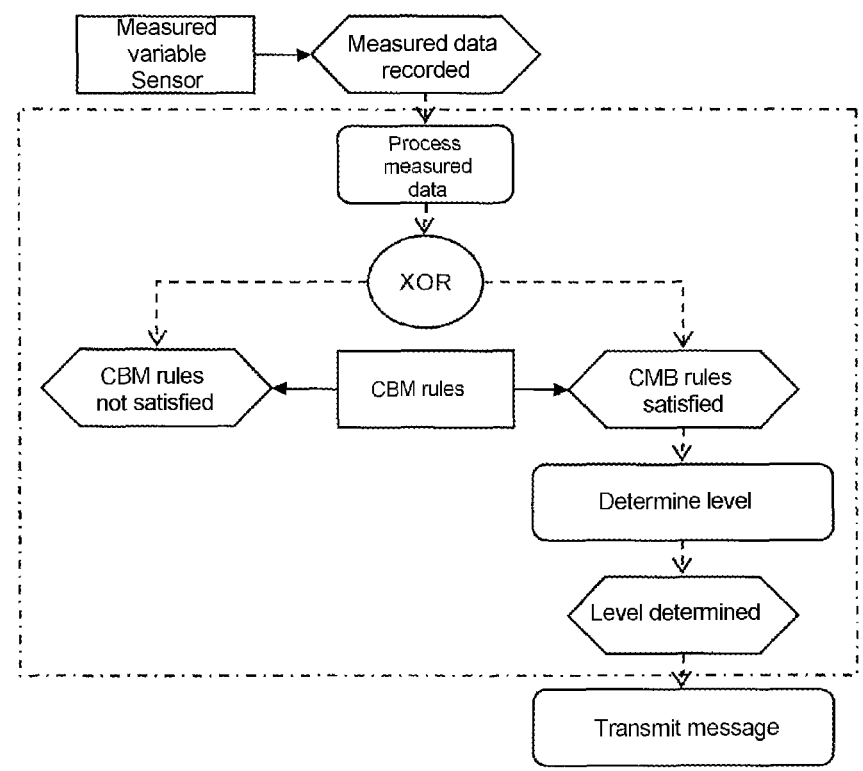
FIG. 5 shows a flow diagram of an embodiment of the method according to a disclosed embodiment.

A flow diagram of a optional form of embodiment of a method for monitoring and diagnosing components of a rail vehicle according to a optional form of embodiment is illustrated in FIG. 5. According to this, in a first step a measured variable which is relevant to a forecast of a repair or maintenance which may be necessary of the component is recorded by means of a sensor or measuring device, and is processed or evaluated in the evaluation software. If the captured and processed measured variables do not satisfy the CBM rules, they are adapted in such a way that they satisfy the CBM rules. The CBM measured variables that have been captured and processed, and if necessary adapted to the CBM rules, are then categorized according to their urgency level, for which the evaluation software is appropriately designed. The box indicated with a dot-dash line in FIG. 5 marks the scope of the evaluation software or CBM logic as it is integrated into the evaluation device concerned.

The message is then generated by the evaluation software or CBM logic, and transmitted to the central unit 18 for forwarding to the control center 28.

Figure 6:
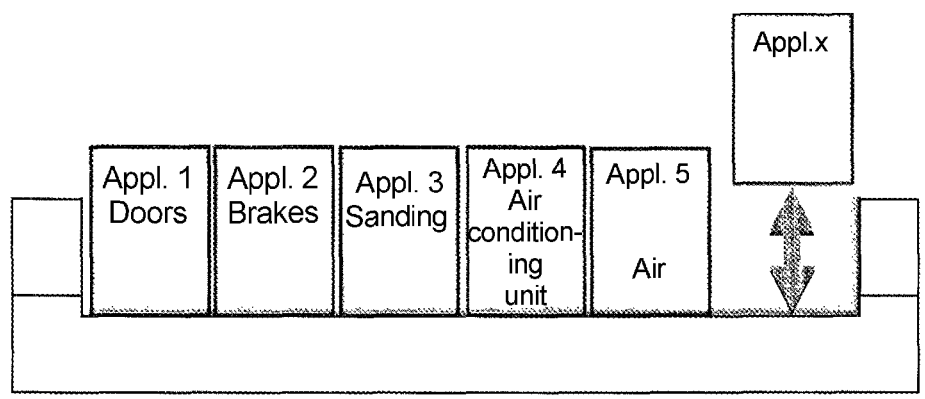
FIG. 6 shows a schematic representation of a modular structure of the evaluation software that is used in the method according to a disclosed embodiment.

The evaluation software or CBM logic implemented in an evaluation device or in a plurality of evaluation devices is illustrated in FIG. 6 symbolically as a box, open at the top, in which individual software modules App1.1 to App1.5 are held. Such a software module is optionally assigned to each component that is to be monitored or diagnosed in respect of a necessary repair or maintenance. In the present case this is, by way of example, the software module App1.1 for the doors, the software module App1.2 for the brakes, the software module App1.3 for the sanding device, and the software module App1.1 for the air supply.

The structure of the evaluation software or CBM logic is therefore optionally modular, the evaluation software being so designed that it can be supplemented with individual software modules. This circumstance is illustrated in FIG. 6 in that a software module Appl.x is inserted into an empty space in the box. Optionally it is also possible for individual software modules to be deleted or exchanged. Such a supplementation, extension, modification or adaptation of the evaluation software or CBM logic is performed through instructions, data and/or software modules sent directly by the control center 28 or through the central unit 18 to the evaluation device(s) 10, 12.

Every possible combination of features of the exemplary embodiments described above are within the scope of the disclosed innovations.

LIST OF REFERENCE NUMBERS

1 Rail vehicle
2 First component
4 Second component
6 First measuring device
8 Second measuring device
10 First evaluation device
12 Second evaluation device
14 First message
16 Second message
18 Central unit
20 Data bus
22 Server
24 Display device
26 Device
28 Control center

The invention claimed is:

1. A method for monitoring and diagnosing components of a single rail vehicle or part of a rail vehicle train including a plurality of rail vehicles with regard to a repair or maintenance of at least one component the method comprising:
    capturing, via at least one measuring device, at least one measured variable, which is relevant to an assessment of the repair or maintenance of the at least one component of the single rail vehicle or part of the rail vehicle train during operation of the single rail vehicle or part of the rail vehicle train;
    evaluating the captured measured variable with regard to the repair or maintenance of the at least one component by an evaluation software implemented in an evaluation device arranged on board the rail vehicle or the rail vehicle train;
    in response to the evaluation device determining that the repair or maintenance of the at least one component should be carried out immediately or in the future, generating a message relating to that determination by the evaluation device and transmitting the message, to a control center, which is located outside the rail vehicle or outside the rail vehicle train during operation of the single rail vehicle or part of the rail vehicle train, and
    supplementing, extending, modifying or adapting the evaluation software implemented in the evaluation device based on instructions, data and software modules sent from the control center to the evaluation device during operation of the single rail vehicle or part of the rail vehicle train,
    wherein the evaluation software has a modular structure, wherein individual software modules are extended, deleted or exchanged as required to modify the evaluating performed while the single rail vehicle or part of the rail vehicle train remains in continuous operation, and
    wherein the supplementation, modification or adaptation of the evaluation software implemented in the evaluation device further comprises instructions, data and software modules that control the function of the at least one component.

2. The method as claimed in claim 1, wherein such a software module is assigned to each component that is to be monitored or diagnosed in respect of a necessary repair or maintenance.

3. The method as claimed in claim 1, wherein the supplementation, modification or adaptation of the evaluation software implemented in the evaluation device takes place through wireless communication with the control center.

4. The method as claimed in claim 1, wherein the message contains information about a wear reserve that is still present of the at least one component of the rail vehicle or of the rail vehicle train that is affected by wear.

5. The method as claimed in claim 1, wherein the message contains a forecast of the time remaining until a maintenance or repair of the at least one component is necessary.

6. The method as claimed in claim 1, wherein the message contains information about the cause of a malfunction or fault of the at least one component.

7. The method as claimed in claim 1, wherein the supplementation, modification or adaptation of the evaluation software implemented in the evaluation device is performed based on instructions, data and/or software modules sent from the control center to the evaluation device also such instructions, data and/or software modules that relate to the function as intended of the at least one component.

8. The method as claimed in claim 1, wherein a central unit, which communicates with the evaluation device and delivers the message to the control center, is provided on board the rail vehicle or the rail vehicle train.

9. The method as claimed in claim 8, wherein the message is transmitted wirelessly from the evaluation device or from the central unit to the control center.

10. The method as claimed in claim 1, wherein the message is output in the control center in visual form.

11. The method as claimed in claim 1, wherein the message contains different urgency levels in respect of a necessary maintenance or repair of the at least one component.

12. The method as claimed in claim 1, wherein the message contains the present location of the rail vehicle or of the rail vehicle train.

13. The method as claimed in claim 1, wherein in the case of a plurality of rail vehicles grouped together into a rail vehicle train, the message identifies the rail vehicle affected by a necessary maintenance or repair.

14. The method as claimed in claim 1, wherein further measured variables that are not related to the at least one component are evaluated by the evaluation device.

15. The method as claimed in claim 14, wherein the further measured variables relate to the environment or to the route being traveled by the rail vehicle or the rail vehicle train.

16. The method as claimed in claim 1, wherein the evaluation device is connected to a data bus of the rail vehicle or of the rail vehicle train for forwarding the message.

17. The method as claimed in claim 1, wherein the at one component is at least one of the following components: bogie equipment, air conditioning unit, air supply system, electrical supply system, sanding system, door opening and closing system, windscreen wiper apparatus, friction-based braking system, generator-based braking system, magnetic disc brake, toilets, brake controller.

18. A system for monitoring and diagnosing components of a single rail vehicle or part of a rail vehicle train consisting of a plurality of rail vehicles, with regard to a repair or maintenance which may be necessary of at least one component, with at least one measuring device and an evaluation device,
   wherein the system is configured capture, via at least one measuring device, at least one measured variable, which is relevant to an assessment of the repair or maintenance of the at least one component of the single rail vehicle or part of the rail vehicle train during operation of the single rail vehicle or part of the rail vehicle train, evaluate the captured measured variable with regard to the repair or maintenance of the at least one component by evaluation software implemented in the evaluation device arranged on board the rail vehicle or the rail vehicle train, and in response to the evaluation device determining that the repair or maintenance of the at least one component should be carried out immediately or in the future, generate a message relating to that determination by the evaluation device and transmit the message, to a control center, which is located outside the rail vehicle or outside the rail vehicle train during operation of the single rail vehicle or part of the rail vehicle train,
   wherein supplementation, extension, modification or adaptation of the evaluation software implemented in the evaluation device is performed based on instructions, data and software modules sent from the control center to the evaluation device during operation of the single rail vehicle or part of the rail vehicle train, and
   wherein the evaluation software has a modular structure, wherein individual software modules are extended, deleted or exchanged as required to modify operation of the evaluation device while the single rail vehicle or part of a rail vehicle train remains continuously in operation, and
   wherein the supplementation, modification or adaptation of the evaluation software implemented in the evaluation device further comprises instructions, data and software modules that control the function of the at least one component.

* * * * *